J. CORBEIL.
Car-Starters.

No. 141,326.             Patented July 29, 1873.

UNITED STATES PATENT OFFICE.

JOSEPH CORBEIL, OF LIND, WISCONSIN.

IMPROVEMENT IN CAR-STARTERS.

Specification forming part of Letters Patent No. 141,326, dated July 29, 1873; application filed January 18, 1873.

*To all whom it may concern:*

Be it known that I, JOSEPH CORBEIL, of Lind, in the county of Waupaca and State of Wisconsin, have invented certain Improvements in Street-Car Starters, of which the following is a specification:

My invention relates to a novel arrangement of devices by which the driver or conductor of a street-car is enabled to assist the horses in starting the same; and the arrangement consists in a hand-lever mounted on the frame, and provided with pawls engaging in the periphery of one of the wheels.

Figure 1:
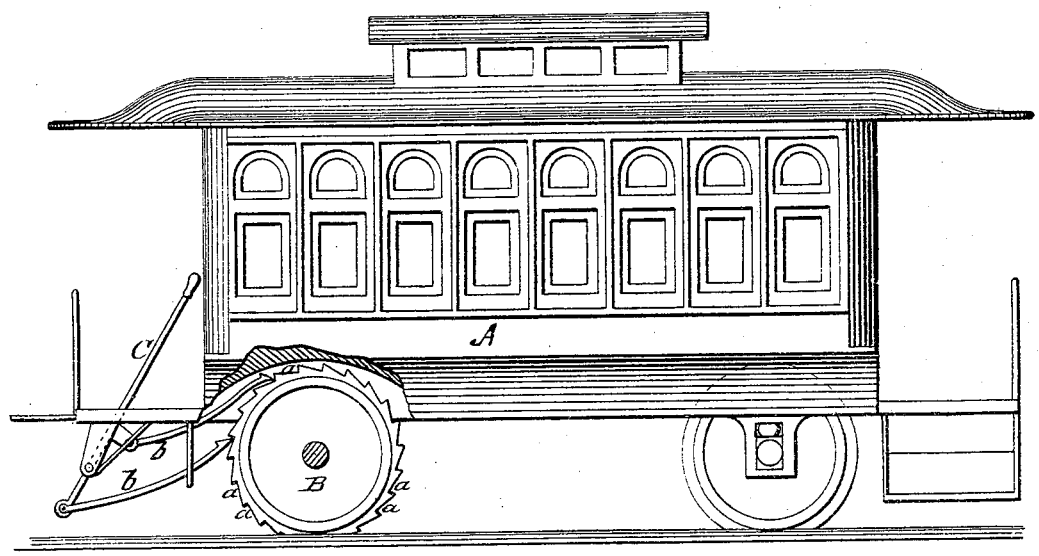
Figure 2:
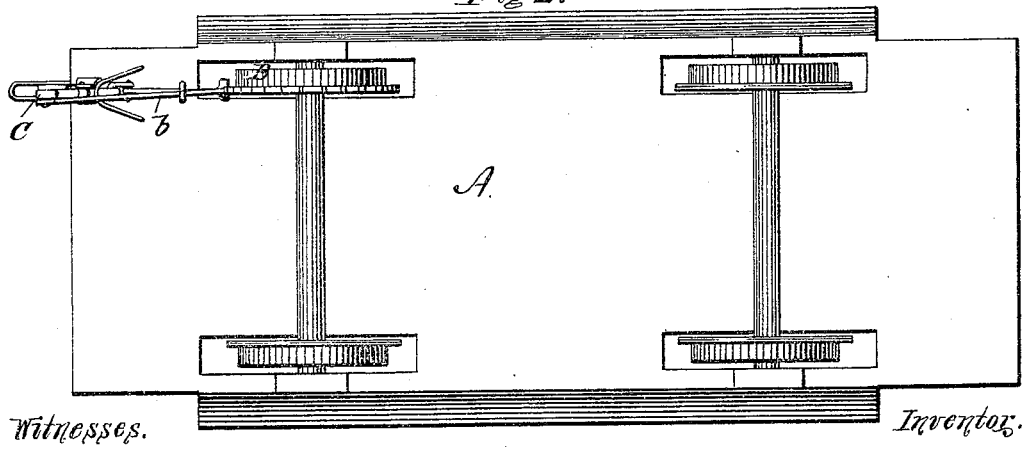

Figure 1 is a side elevation of a car provided with my improvement, a portion of the body being broken away in order to expose the device to view, and Fig. 2 is a bottom-plan view of the car.

In applying my invention I leave the body A of the car unchanged, but provide one of the wheels, B, with teeth or notches $a$ in its periphery, as shown in both figures. I then mount, in the platform or in any other convenient position, an upright hand-lever, C, and provide the same with two pawls or dogs, $b$, one above and the other below the fulcrum, arranged to engage in the top of the toothed wheel, as shown.

As the lever is moved to and the two dogs are thrown forward alternately, and caused to turn or assist in turning the wheel to start the car.

When a single lever is used on one end of the car, as shown, it will be operated by the conductor when the car is traveling in one direction, and by the driver when it is traveling in the opposite direction. Two levers may, however, be used, one at each end of the car, and they may be arranged to be operated by the driver or the conductor, as desired; this is of course supposing that the cars are run in the ordinary manner, first one end forward, and then the other.

The parts may be so proportioned that great leverage will be exerted on the wheel, and the operator enabled to give the horses very material assistance.

My contrivance is exceedingly cheap, simple, and durable, is applicable to cars now in use, as well as to others, and enables the driver or conductor to give the horses great assistance in overcoming the inertia and starting the car, an operation which is now the cause of great strain and injury to both horses and harness.

It is obvious that instead of having the dogs engage in the car-wheels, other wheels may be secured upon the axles for the special purpose.

It will be observed that in the operation of my contrivance, the two pawls acting alternately exert a continuous unbroken strain as long as the movement of the hand-lever is continued, the movement of the car caused by one pawl being followed up and continued by the other, so that the car is started steadily and gradually. This arrangement permits the hand-lever to be given much greater leverage or purchase than could be otherwise done to advantage.

I am aware that various arrangements have been devised for the purpose of starting street-cars, some of which are operated by the teams, and others by hand. My arrangement, however, differs in construction from all others, and is the only one by which a great amount of power can be applied by hand continuously for any required length of time.

Having thus described my invention, what I claim is—

In combination with the toothed wheel of a street-car, the hand-lever provided with the two pawls, when arranged as shown and described, so that the vibration of the lever causes a continuous forward strain upon the wheels.

JOSEPH CORBEIL.

Witnesses:
  EUCIA WEST,
  CATHARINE MCLEAN.